(12) United States Patent
Rettig (10) Patent No.: US 10,809,047 B2
(45) Date of Patent: Oct. 20, 2020

(54) WELDING GAUGE

(71) Applicant: Gary P Rettig, Chelsea, AL (US)

(72) Inventor: Gary P Rettig, Chelsea, AL (US)

( * ) Notice: Subject to any disclaimer, the term of this patent is extended or adjusted under 35 U.S.C. 154(b) by 0 days.

(21) Appl. No.: 14/830,666

(22) Filed: Aug. 19, 2015

(65) Prior Publication Data

US 2017/0227344 A1     Aug. 10, 2017

(51) Int. Cl.
    *G01B 5/00*      (2006.01)

(52) U.S. Cl.
    CPC ................... *G01B 5/0037* (2013.01)

(58) Field of Classification Search
    CPC ............................... G01B 5/0037; G01B 5/24
    USPC ................... 33/1 N, 418, 419, 460, 465, 534
    See application file for complete search history.

(56) References Cited

U.S. PATENT DOCUMENTS

| | | | |
|---|---|---|---|
| 2,389,842 A | 4/1943 | Cummins | |
| 2,603,872 A | 1/1949 | Jones | |
| 3,597,848 A | 8/1971 | Matson | |
| 4,485,558 A | 12/1984 | Lycan | |
| 4,545,124 A | 10/1985 | Brooks | |
| 4,637,142 A | 1/1987 | Baker | |
| 4,712,307 A * | 12/1987 | Kish ....................... | E04D 15/00 33/421 |
| 4,736,524 A * | 4/1988 | King ....................... | G01B 3/56 33/353 |
| 4,924,580 A | 5/1990 | Garofalo | |
| 5,205,045 A * | 4/1993 | Liu ....................... | B23Q 9/005 33/426 |
| 5,337,489 A | 8/1994 | Mustafa | |
| 5,461,794 A * | 10/1995 | Huang ....................... | B43L 7/10 33/418 |
| 5,611,149 A * | 3/1997 | Fujiwara .............. | G01B 5/0037 33/534 |
| 6,505,410 B1 | 1/2003 | Lycan | |
| 7,269,909 B1 * | 9/2007 | Barbieri .................... | B43L 7/12 33/419 |
| 7,513,057 B2 * | 4/2009 | Robison ................... | B43L 7/10 33/471 |
| 7,739,806 B1 * | 6/2010 | Pater ....................... | B25H 7/02 33/415 |
| 9,021,641 B2 | 5/2015 | Leach et al. | |
| 2004/0245222 A1 | 12/2004 | Gobel | |
| 2006/0283032 A1 * | 12/2006 | Yang ....................... | B43L 7/005 33/419 |
| 2014/0230263 A1 | 8/2014 | Livitski | |

(Continued)

*Primary Examiner* — George B Bennett
(74) *Attorney, Agent, or Firm* — Christopher R Ganter, LLC (57) ABSTRACT

A welding gauge and method of use that allows a user to measure the difference in height between a first material surface with that of a second material surface when they are welded together along the same plane or at an angle. The gauge has a first plate with a foot portion and a bottom reference edge. The first plate is connected to a second plate at an axis of rotation corresponding to a circular measurement scale located on the first plate. The gauge also has a third plate that is attachable to the second and slidably connected through vertical slots located in said second and third plates. The third plate has a bottom contact edge and tolerance indicators along its left and right edges that can align with a tolerance measurement scale located on the second plate and along the vertical slot of the second plate.

20 Claims, 5 Drawing Sheets

(56) References Cited

U.S. PATENT DOCUMENTS

2014/0373372 A1* 12/2014 Flippo .................. B43L 7/10
                                                    33/418
2015/0082646 A1    3/2015 Palynchuk
2015/0168122 A1*  6/2015 Cruickshanks ........ G01B 3/563
                                                    33/425
2016/0061593 A1*  3/2016 Zhuang .................. G01C 9/18
                                                    356/138

* cited by examiner

WELDING GAUGE

CROSS-REFERENCED TO RELATED APPLICATIONS

None

FEDERALLY SPONSORED RESEARCH

None

SEQUENCE LISTING

None

FIELD OF THE INVENTION

This invention relates to a welding gauge, and more particularly to a welding gauge that is capable of determining the difference in height between a first material surface and a second piece of material surface where the two are welded together on the same plane or at an angle with each other with using a butt weld and/or a V-weld.

BACKGROUND OF THE INVENTION

There are many different types of welding gauges in existence, but there are no gauges that allow a user to measure the height difference or tolerance between a reference piece of material surface and the surface of a second welded material surface when welded at an angle with each other. Further, there are no gauges targeted at determining how well a weld fits together two pieces of welded material. When welding flat planar material or tubular material together, there is a need to ensure that the materials being welded together are joined sufficiently precise for the application at hand. Specifically, a gauge is needed that allows a user to measure how much the height of a second welded material differentiates with the height of the original or reference piece of material at either a horizontal or angular position. A perfect weld would be such that the planes of the top surfaces of one material being welded to another material would meet each other to form the exact angle that is desired of the weld.

In many cases, and especially with angular welds, it is difficult to ascertain if the two pieces of material meet exactly at their top surfaces because the two pieces of material have to be prepared to receive a butt weld bead and/or a V-weld bead. This preparation usually involves grinding away some of the top edge of the two pieces of material which removes some of the material at the weld junction. This leads to the inability to place the very top edge of one piece of material against the top edge of the second piece of material to ensure the pieces align. If the weld is performed perfectly, the exact angle desired will be formed between the top surfaces of the two pieces. If the weld is imperfect, then the exact angle desired will not be achieved. What is needed in the art is a gauge that will allow a user to measure how imperfect a flat or angular weld is between two pieces of material. This will allow the user to determine whether the weld is acceptable within the appropriate tolerances dictated by specific job criteria.

Among other areas of application, the gauge is highly applicable to the situation where a fabricator is tasked with the creation of segmented angular joints in piping systems out of straight pipe. This is done by measuring and cutting sections of pipe such that when welded together they form various angular degree elbows. These sections of pipe are considered gores in the welding industry. Most commonly these elbows are ninety degrees. Because of the custom nature of creating elbows out of straight pipe, there is an inherent variability in the quality and fit of the pipe sections or gores to each other. Often, there are specific job specific criteria and tolerance guidelines that the fabricated gore section elbows must adhere to. A gauge is needed that can assist a welder in determining if the pipe sections are fabricated and welded in such a fashion as to conform to the applicable job specific criteria.

SUMMARY OF THE INVENTION

The present invention is a welding gauge and method of use that allows a user to measure the difference in height between a first material surface with that of a second material surface when they are welded together along the same plane or at an angle. The gauge has a first plate with a foot portion and a bottom reference edge. The first plate is connected to a second plate at an axis of rotation corresponding to a circular measurement scale located on the first plate. The gauge also has a third plate that is attachable to the second plate by way of nut and bolt through vertical slots located in said second and third plates. The third plate has a bottom contact edge. The first plate foot portion bottom reference edge is placed on a first material surface, the gauge is adjusted to an appropriate angle on the circular measurement scale, and the third plate bottom contact edge is placed onto an adjoining second material surface in a flush manner and a measurement scale located on the second plate indicates the difference in height between the first material and second material by way of tolerance indicators located on the third plate.

DETAILED DESCRIPTION

Figure 1:
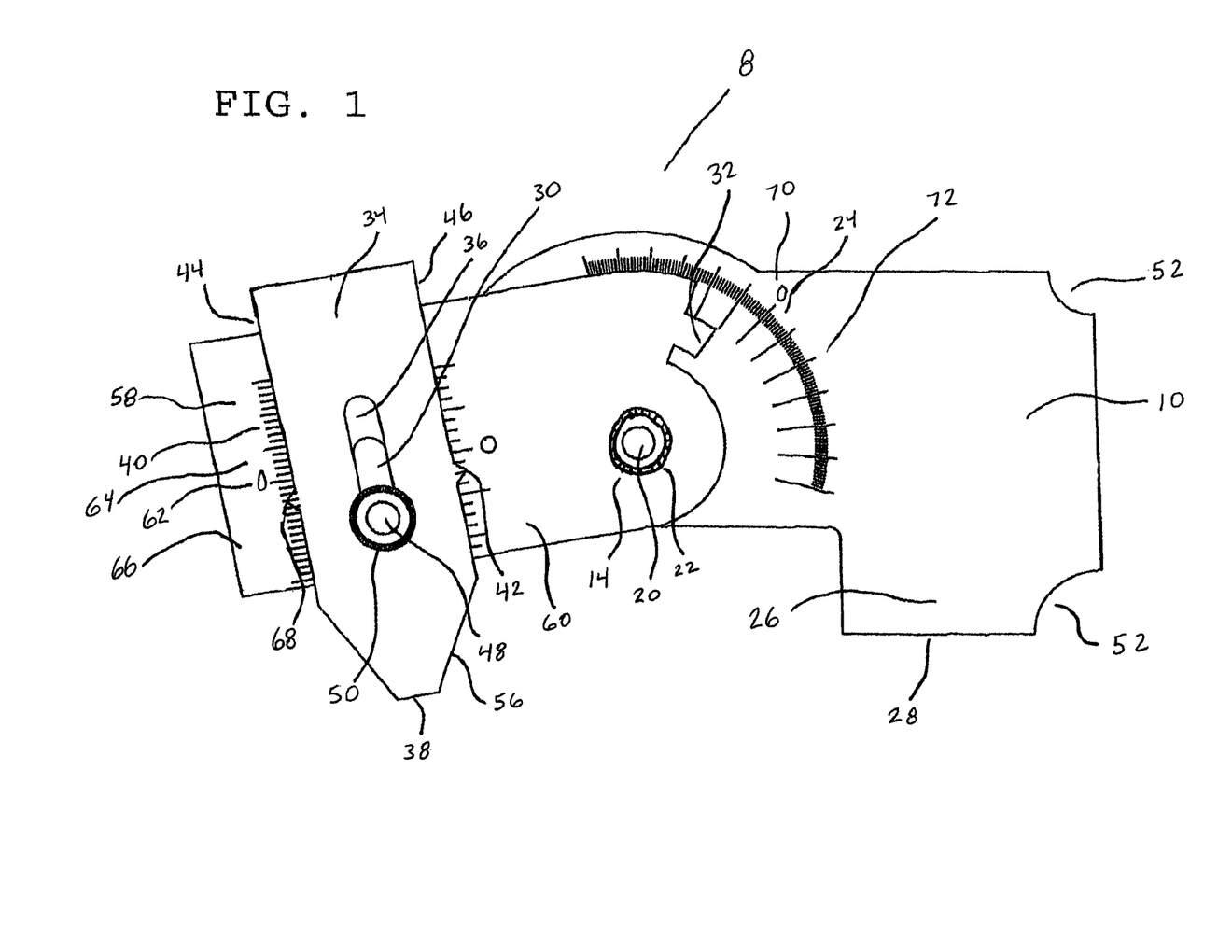
FIG. 1 is a top plan view of an embodiment of the gauge.
Figure 4:
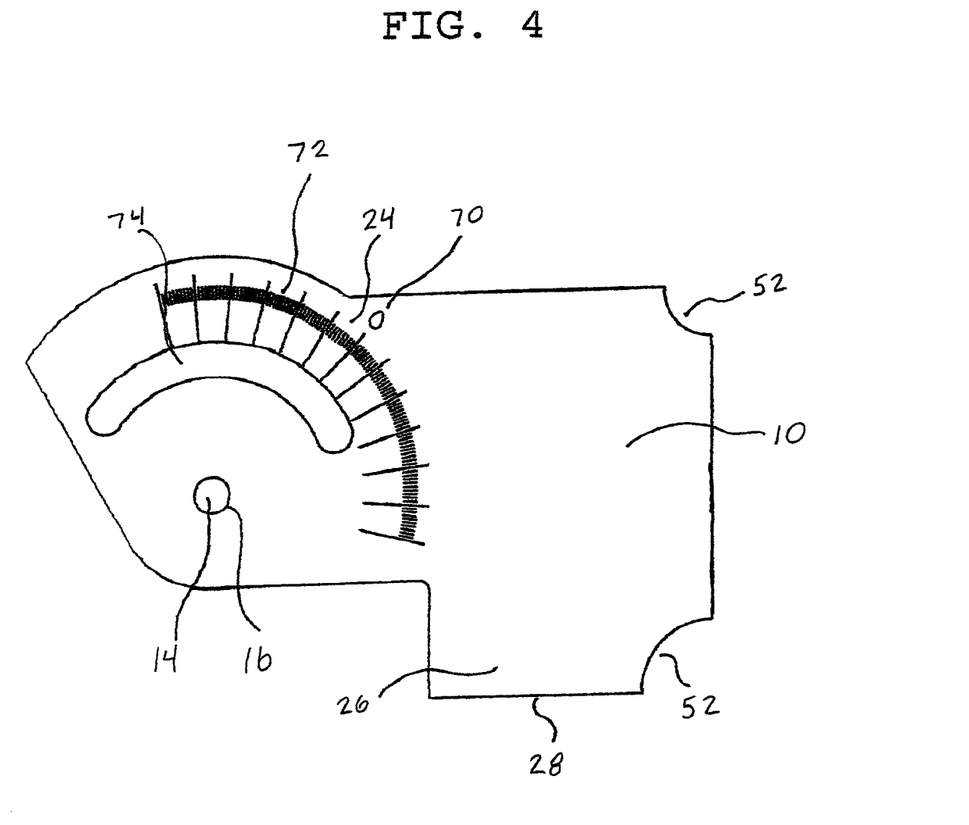
FIG. 4 is a top plan view of the first plate of the gauge.
Figure 5:
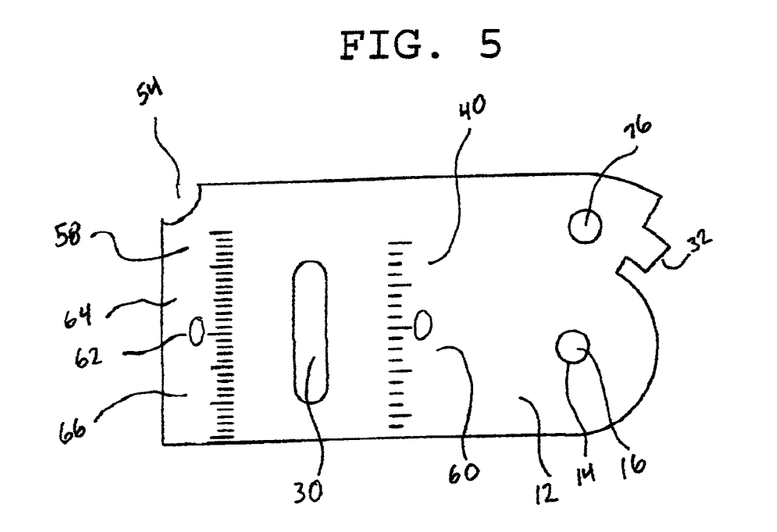
FIG. 5 is a top plan view of the second plate of the gauge.

Referring now FIG. 1, therein is shown a first plate 10 and a second plate 12, said first plate 10 and said second plate 12 joined at an axis of rotation 14, where apertures 16 as shown in FIG. 4 and FIG. 5, are located in said first plate 10 and said second plate 12 at said axis of rotation 14, a threaded bolt 20 insertable into said apertures 16 and secured by a nut 22 such that the first 10 and second plates 12 are rotatable around said axis of rotation 14 upon the loosening and tightening of the nut 22 on the bolt 20, a circular measurement scale 24 on said first plate 10 that corresponds to the axis of rotation 14, said first plate 10 having a foot portion 26 with a bottom reference edge 28, said second plate 12 having a vertical slot 30 and a measurement edge 32 where the measurement edge 32 is adapted to indicate an angular measurement on said circular measurement scale 24 located on said first plate 10, a third plate 34 with a vertical slot 36 such that the third plate 34 vertical slot 36 conforms to the second plate 12 vertical slot 30, the third plate 34 having a bottom contact edge 38, the second plate having at least one tolerance measurement scale 40 along its vertical slot 30, the third plate 34 having means for indicating a tolerance measurement 42 on a left 44 and/or right edge(s) 46 such that the tolerance indicating means 42 aligns with the tolerance measurement scale(s) 40 of the second plate 12, and a bolt 48 and a nut 50 wherein the bolt 48 is inserted into the vertical slots 30 and 36 of the second 12 and third plate 34 and is secured at a desired position with the nut 50 such that the third plate 34 can be fastened and unfastened and slidable along the vertical slots 30 and 36 as the bottom contact edge 38 comes into contact with a desired surface.

The first plate 10 and second plate 12 are rotatable around the axis of rotation 14 when the bolt 20 and nut 22 are loosened. The circular measurement scale 24 has angular graduations 72 which are positioned above and below the zero angle graduation 70 and along the circular measurement scale 24. In use, the first plate 10 and second plate 12 are adjusted by loosening the bolt 20 and nut 22 to allow the movement of said plates 10 and 12 such that the measurement edge 32 of the second plate 12 aligns with the desired angular graduation 72 along the circular measurement scale 24. The desired angular graduation 72 is usually foreknown to the user as the user has already designated what angular difference the plane of a second material surface is from the plane of a first material surface. In one embodiment, the circular measurement scale 24 has sixty angular graduations 72 above the zero angle graduation 70 and sixty angular graduations 72 below the zero angle graduation 70 on the circular measurement scale 24. If an angular graduation 72 is chosen above the zero angle graduation 70, the angle between the bottom reference edge 28 of the foot portion 26 of the first plate 10 and the bottom contact edge 38 of the third plate 34 will be an obtuse angle which is less than 180 degrees. The corresponding angle between the surface that the bottom reference edge 28 is resting upon and the surface that the bottom contact edge is resting upon is a reflex angle which is the difference between the obtuse angle and 360 degrees. If an angular graduation 72 is chosen below the zero angle graduation 70, the angle between the bottom reference edge 28 of the foot portion 26 of the first plate 10 and the bottom contact edge 38 of the third plate 34 will be a reflex angle which is greater than 180 degrees. The corresponding angle between the surface that the bottom reference edge 28 is resting upon and the surface that the bottom contact edge 38 is resting upon is an obtuse angle which is the difference between the reflex angle and 360 degrees.

The second plate 12 vertical slot 30 has along its length at least one tolerance measurement scale 40. In a preferred embodiment there is a tolerance measurement scale 40 on each side of the vertical slot where one is a metric measuring scale 58 and the other is a standard measurement scale 60 and another. The tolerance measurement scale(s) 40 has a zero tolerance graduation 62 with negative tolerance graduations 66 below the zero tolerance graduation 62 and positive tolerance graduations 64 above the zero tolerance graduation 62. The measurement edge 32 of the second plate 12 is formed such that it is a radial projection from the axis of rotation 14 and when the measurement edge 32 indicates zero degrees on the circular measurement scale 24 it is at a forty-five degree angle relative to the top and bottom edge of the second plate 12.

The third plate 34 is generally rectangular in shape, however, various shapes could be employed. The vertical slot 36 cut into the third plate 34 conforms to the vertical slot 30 of the second plate such that when a bolt 48 is inserted through both vertical slot 30 of the second plate 12 and vertical slot 36 of the third plate, and a nut 50 installed onto said bolt 48, the third plate is slidable along the tolerance measurement scales(s) 40. The third plate 34 has a bottom contact edge 38 that is flat and in one embodiment the lower portion of the third plate 34 can taper 56 down to the bottom contact edge 38. The means 42 for indicating a tolerance are formed in various ways such that they accurately point to the corresponding tolerance measurement on the tolerance measurement scales(s) 40. These means 42 include forming as part of the third plate on its left edge 44 and right edge 46 protruding points 68 in the central region of the third plate 34. Other means 42 include laser etching or engraving an indicating line or arrow on the left edge 44 and the right edge 46 of the third plate 34. The tolerance indicating means 42 should be located on the left edge 44 and the right edge 46 of third plate in the exact position that corresponds to the zero tolerance graduations 62 of the tolerance measurement scale(s) 40 when the measurement edge 32 indicates the zero angle graduation 70 of the circular measurement scale 24, when the bottom reference edge 28 is full contact with a flat surface, and when the bottom contact edge 38 is also in full contact with the same flat surface. The circular measurement scale 24 and the tolerance measurement scales 40 can either be engraved or laser etched into the surfaces of the first plate 10 and second plate 12.

While the gauge 8 may be used in numerous contexts, the gauge 8 is well suited for use in checking the accuracy of fabricated pipe elbows. In the context of forming pipe elbows out of straight pipe, a fabricator will decide how many sections of pipe will be used to form the desired elbow. For purposes of illustration, the formation of a three gore or three pipe segment ninety degree elbow is given as follows. The fabricator must cut three appropriately sized pieces of straight pipe section so that the first piece aligns with a straight pipe, the second piece must be cut such that plane of the second piece of material on the convex surface of the elbow is forty-five degrees different than the first piece, and also to meet a third piece that will be forty-five degrees different in plane from the second piece. To check the height difference of these pipe segments a fabricator would take the gauge 8 and rotate the first plate 10 and second plate 12 such that the measurement edge 32 would align at the forty-five degree mark on the circular measurement scale 24 above the zero angle graduation 70. The gauge 8 bottom reference edge 28 would be placed on the surface of the first segment of pipe and the bottom contact edge 38 would be placed on the surface of the second segment of pipe after adjustment of the third plate 34 using the bolt 48 and nut 50 such that the bottom contact edge 28 is in full contact with the second pipe segment surface and the nut 50 tightened on the nut. The fabricator would then examine the tolerance measurement scale 40 to notate the height difference, if any, between the second segment and the first segment of pipe. The same steps would be repeated for comparing the second pipe segment surface with that of the third pipe segment surface. The results notated on the tolerance measurement scales(s) 40 would then be compared to the job requirements in place for the amount of tolerance allowed for height difference of the pipe segments.

Generally, the gauge 8 can be used on an outer portion, or convex side of a pipe elbow, or the gauge 8 can be used on the inner portion, or concave side of a pipe elbow. If the gauge 8 is used on the convex side of the pipe elbow, the total angle between the first material surface and the second material surface will be a reflex angle greater than 180 degrees. If the gauge 8 is used on the concave side of a pipe elbow, the total angle between the first material surface and the second material surface will be an obtuse angle greater than 90 degrees but less than 180 degrees. The angular graduations 72 on the circular measurement scale 24 do not indicate the total angle formed between a first material surface and a second material surface. Rather, the angular graduations 72 indicate the amount of angular deviation or change from the plane of a first material surface to the plane of the second material surface. In one embodiment, the circular measurement scale 24 has sixty angular graduations 72 above the zero angle graduation 70 and sixty angular graduations 72 below the zero angle graduation 70 on the circular measurement scale 24.

The first plate 10 and the second plate 12 are can be joined together using different means 18. One means is to use a rivet to join the first plate 10 and the second plate 12 at the axis of rotation 14 such that the rivet allows rotation of the first plate 10 and second plate 12 around the axis of rotation 14 but also provides a firm frictional connection. Another means is to use a nut 22 and a bolt 20 to join first plate 10 and second plate 12. The nut 22 can have a knurled outer surface for enhancement of finger grip. This means allows the gauge to be adjusted and secured so that the measurement edge 32 stays fixed on the appropriate angular measurement on the circular measurement scale 24. The bolt 48 and the nut 50 used to join the third plate 34 to the second plate 12 can be of many type nuts such as a wingnut, a standard nut, a knobbed nut and a nut with knurls on its outer surface The welding gauge 8 first plate 10 and second plate are configured and joined at the axis of rotation 14 such that when the gauge 8 is placed on a flat surface such that the bottom reference edge 28 of the first plate 10 and the bottom contact edge 38 of the third plate 34 after adjusted are flush with the flat surface, the measurement edge 32 of the second plate 12 will align with the zero angle graduation 70 on the circular measurement scale 24 located on the first plate 10 and a tolerance indicator of the third plate 34 will align with the zero tolerance graduation(s) 62 of the tolerance measurement scale(s) 40 located on the second plate 12.

The gauge 8 is made by way of laser cutting, metal stamping or by welding. The gauge 8 may be made of most any rigid material such as wood, plastic, carbon fiber and metal.

Figure 2:
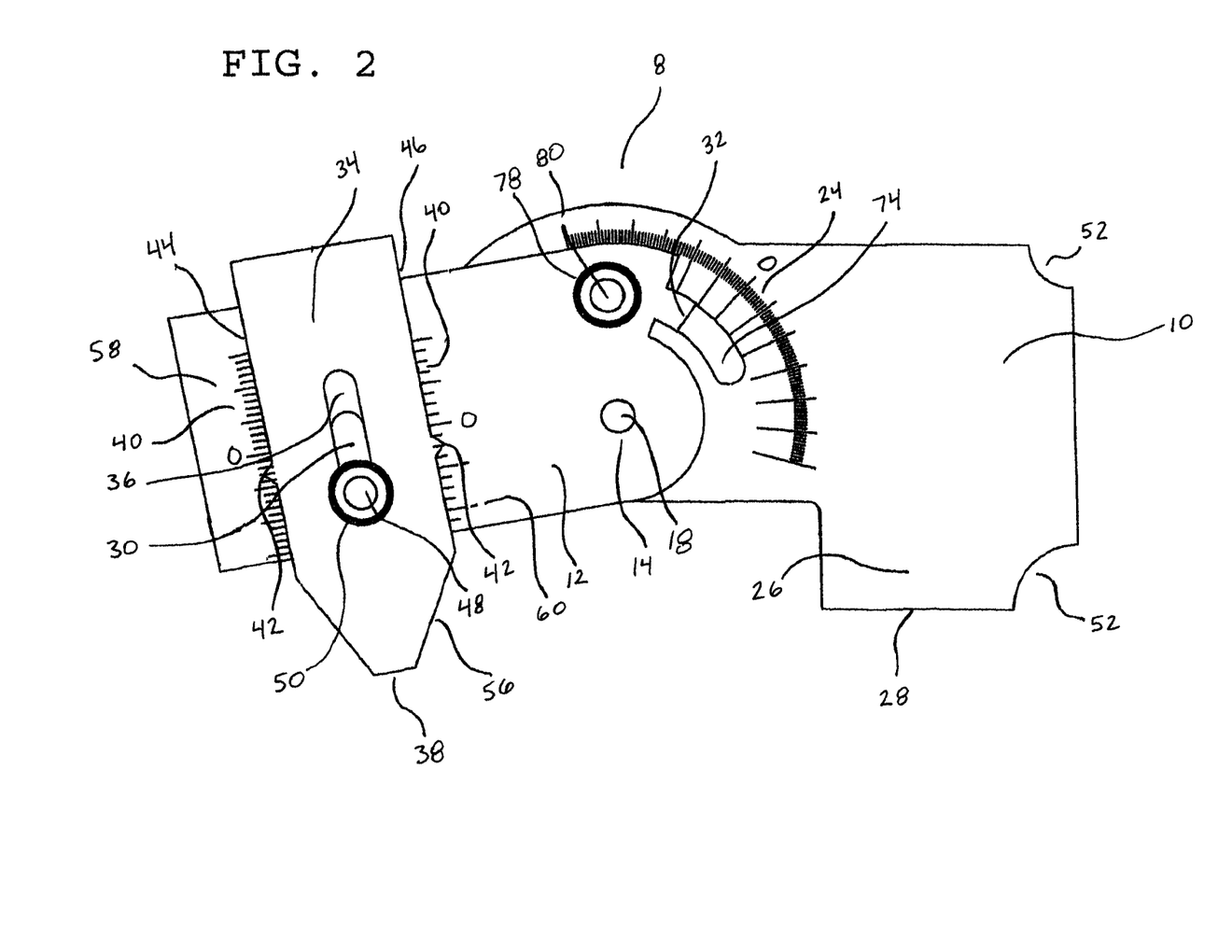
FIG. 2 is a top plant view of an alternate embodiment of the gauge.

Referring now to FIG. 2, there is disclosed an embodiment of the gauge 8 whereby the gauge 8 is joined at the axis of rotation 14 by a rivet. There is located in the first plate 10 a circular slot 74 and an aperture 76 is located in the second plate. The circular slot 74 and the aperture 76 share are the same distances or radius from the axis of rotation 14 in their respective positions within first plate 10 and second plate 12 such that when the first plate 10 and second plate 12 are rotated along the axis of rotation 14 the circular slot 74 and aperture 76 conform and overlap with each other. A bolt 80 is inserted through the aperture 76 and the circular slot 74 and a nut 78 is used to secure the first plate 10 and the second plate 12 at a desired position along the circular measurement scale 24. This embodiment of the gauge 8 allows for a steady and secure way of setting the appropriate angle with the measurement edge 32 on the circular measurement scale 24 by having the joining means 18 be a rivet with some frictional connection between the first plate 10 and the second plate 12 such that it is easier to set the angle on the circular measurement scale 24 due to the joining means 18 rivet already applying pressure to the first plate 10 and second plate 12 such that they cannot rotate with utter ease. A knurled nut can be used for nut 78.

Figure 3:
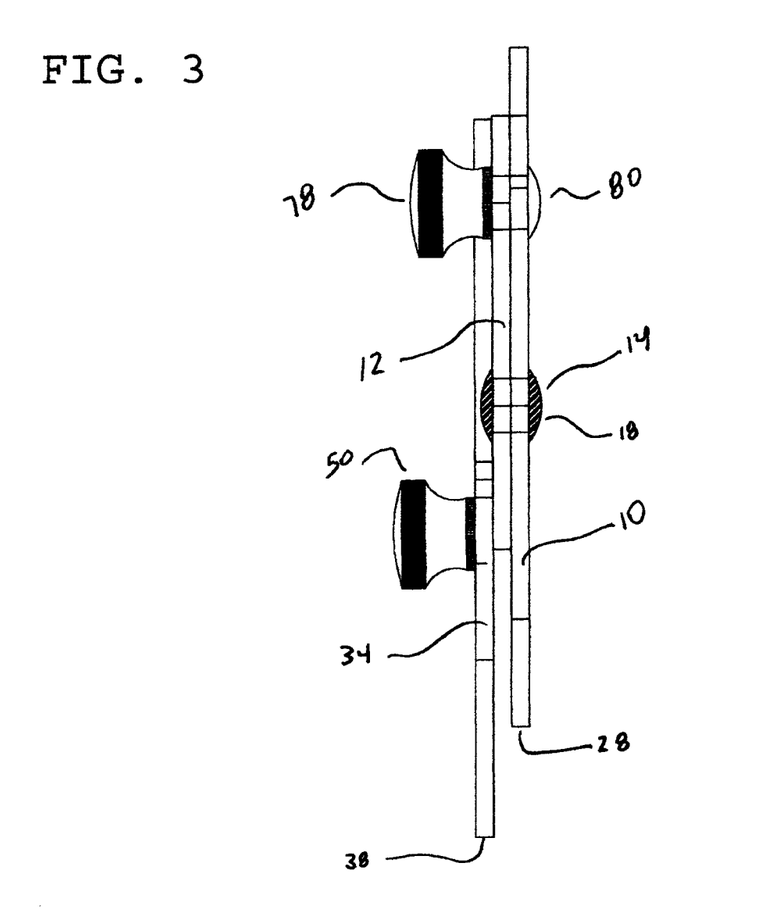
FIG. 3 is a side view of the gauge.

Referring now to FIG. 3, there is shown a right side view of the gauge 8 where the axis of rotation 14 is shown with the joining means 18. The first plate 10 and the second plate 12 are joined by said means 18. The nut 78 and the bolt 80 are shown securing the first plate 10 and the second plate 12. The third plate 34 is secured to the second plate 12 using nut 50 and bolt 48 as shown in FIGS. 1-2. The bottom reference edge 28 of the first plate 10 and the bottom contact edge 38 of the third plate 34 are also shown.

Referring now to FIG. 4 there is shown the first plate 10 disengaged from the gauge 8. There is shown the first plate 10 having in a foot portion 28 a bottom reference edge 28. The bottom reference edge 28 in use will be placed onto the flat surface of first material that has been welded to a second material. The axis of rotation 14 is along and through the aperture 16. The circular measurement scale 24 is shown having a zero angle graduation 70 with angular graduations 72 both above and below the zero angle graduation 70. The circular measurement scale 24 corresponds to the circular slot 74. Also shown are the outer corners 52 whereby they are notched for the purpose of measuring bead and fillet welds.

Referring to FIG. 5 there is shown the second plate 12 having a measurement edge 32 and a vertical slot 30. The axis of rotation 14 is along and through the aperture 16. Aperture 76 is for use with the circular slot 74 as shown in FIG. 4 for purposes loosening and tightening the first plate 10 and second plate 12 with a nut and bolt along the circular measurement scale 24 at a desired point as also shown in FIG. 4. Along the vertical slot 30 there are tolerance measurement scales 40 having a zero tolerance graduation 62, positive tolerance graduations 64 and negative tolerance graduations 66. One tolerance measurement scale 40 can be a metric measuring scale 58 and the other can be a standard measurement scale 60. There is also shown an outer corner 54 that has been notched for purposes of measuring a bead or fillet weld.

Figure 6:
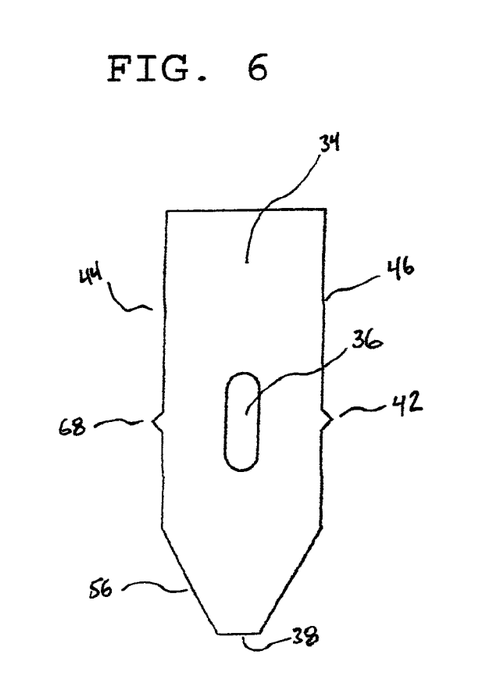
FIG. 6 is a top plan view of the third plate of the gauge.

Referring to FIG. 6 there is shown the third plate 34 having a bottom contact edge 38 that will rest on the flat surface of a second piece of material that has been welding onto a first piece of material. Also shown is a vertical slot 36 that conforms to the vertical slot 30 of the second plate 12 as shown in FIG. 5 such that they can be slidably connected together. The third plate 34 has a tolerance indicating means 42 on a left edge 44 and a right edge 46. The third plate 34 in one embodiment can have a taper 56 in its lower portion that terminates into the bottom contact edge 38. The taper 56 allows the third plate 34 bottom contact edge 38 to fit onto surfaces where tight space confines. The tolerance indicating means 42 can be a protruding point 68 formed into the left edge 44 or right edge 46 of the third plate 34. In other embodiments a point, line, arrow or other similar means could be laser etched or engraved along the left edge 44 and right edge 46 of the third plate 34. Tolerance indicating means 42 could also comprise painting a visible mark along the left edge 44 and right edge 46 along the third plate 34 in a number of different shapes that would serve to indicate a tolerance.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

10 First Plate
12 Second Plate
14 Axis of rotation
16 Apertures
18 Joining means
20 Bolt
22 Nut
24 Circular measurement scale
26 Foot portion
28 Bottom Reference Edge
30 Vertical Slot
32 Measurement edge
34 Third Plate
36 Vertical slot
38 Bottom contact edge
40 Tolerance Measurement scale(s)
42 Means for indicating a tolerance measurement
44 Left edge
46 Right edge
48 Bolt
50 Nut
52 First plate outer corners
54 Second plate outer corners
56 Taper
58 Metric measuring scale
60 Standard measurement scale
62 Zero tolerance graduation
64 Positive tolerance graduation
66 Negative tolerance graduation
68 Protruding Point
70 Zero angle graduation
72 Angular graduations
74 Circular slot
76 Aperture
78 Nut
80 Bolt

I claim:

1. A welding gauge, comprising:
a first plate;
a second plate;
said first plate rotatably connected to the second plate at an axis of rotation; and
a third plate slidably connected to said second plate such that it can be secured or loosened and moved to a desired position.

2. The welding gauge of claim 1 further comprising a circular measurement scale on the first plate that corresponds to the angular rotation around the axis of rotation, at least one tolerance measurement scale on the second plate, a measurement edge on the second plate adapted to indicate an measurement on said circular measurement scale, and means for indicating a tolerance located on the third plate such that tolerance indicating means align with the tolerance measurement scale on the second plate.

3. The welding gauge of claim 2 wherein the first plate has a foot portion formed in its bottom region and said foot portion having a bottom reference edge that is flat.

4. The welding gauge of claim 3 wherein the second plate has a vertical slot and the third plate has a vertical slot such that the vertical slot of the third plate conforms to the vertical slot of the second plate such that the third plate can be connected and slidable along the second plate.

5. The welding gauge of claim 4 wherein the third plate has a bottom contact edge that is flat.

6. The welding gauge of claim 5 wherein the first plate has a circular slot and the second plate has an aperture and the circular slot and aperture are located the same distance away from the axis of rotation.

7. The welding gauge of claim 6 wherein the gauge is made of metal.

8. The welding gauge of claim 7 wherein at least one of the outer corners of the first plate or second plate are notched at varying depths for purposes of measuring a fillet or bead weld.

9. The welding gauge of claim 8 wherein there is a metric measuring scale located along one side of the second plate vertical slot and a standard measurement scale located along the other side of the second plate vertical slot, and said measurement scales having a zero tolerance graduation and positive tolerance and negative tolerance graduations respective to said zero tolerance gradation along the vertical slot.

10. The welding gauge of claim 9 wherein the tolerance measurement scales are laser etched into the first and second plates.

11. The welding gauge of claim 2 wherein the means for indicating a tolerance is a protruding point that is formed on the left and/or right edge of the third plate.

12. The welding gauge of claim 2 wherein the circular measurement scale on the first plate has a zero angle graduation and angular graduation positions greater than zero both above and below of said measurement scale zero angle graduation.

13. A welding gauge, comprising: a first plate and a second plate, said first plate and said second plate joined at an axis of rotation where apertures are located in said first plate and said second plate at said axis of rotation, means for joining said first plate to said second plate through said apertures such that there is a firm but rotatable connection between the first plate and second plate along the around the axis of rotation, a circular slot that corresponds to the axis of rotation located within the body of the first plate, a measurement scale located along and adjacent to said circular slot, said first plate having a foot portion with a bottom reference edge, said second plate having a vertical slot, a measurement edge and an aperture aligned with said circular slot of the first plate, a bolt insertable through said circular slot and said aperture and a nut securable to the bolt, the measurement edge adapted to indicate an angular measurement on said measurement scale located along and adjacent to said circular slot of the first plate, a third plate with a vertical slot such that the third plate vertical slot conforms to the second plate vertical slot, the third plate having a bottom contact edge, the second plate having at least one tolerance measurement scale along its vertical slot, the third plate having means for indicating a tolerance on a left and/or right edge(s) of the third plate such that the tolerance indicating means aligns with the tolerance measurement scale(s) of the second plate, and a bolt and a nut wherein the bolt is inserted into the vertical slots of the second and third plate and is secured at a desired position with the nut such that the third plate can be fastened and unfastened and slidable along the vertical slots as the bottom contact edge comes into contact with a desired surface.

14. The welding gauge of claim 13 wherein the gauge is made of metal.

15. The welding gauge of claim 14 wherein at least one of the outer corners of the first plate or second plate are notched at varying depths for purposes of measuring a fillet or bead weld.

16. The welding gauge of claim 15 wherein there is a metric measuring scale located along one side of the second plate vertical slot and a standard measurement scale located along the other side of the second plate vertical slot, and said measurement scales having a zero tolerance graduation and positive tolerance and negative tolerance graduations respective to said zero tolerance graduation along the vertical slot.

17. The welding gauge of claim 16 wherein the means for indicating a tolerance is a protruding point that is formed on the left and/or right edge of the third plate.

18. The welding gauge of claim 17 wherein the measurement scales are laser etched into the first and second plates.

19. The welding gauge of claim 18 wherein the measurement scale on the first plate has a zero angle graduation and angular graduations greater than zero both above and below of said measurement scale zero angle graduation.

20. The welding gauge of claim 19 wherein when the welding gauge is placed upon a flat surface such that the bottom reference edge of the first plate and the bottom contact edge of the third plate are flush with the flat surface, the measurement edge of the second plate will align with the zero angle degree graduation on the measurement scale located on the first plate and a tolerance indicator of the third plate will align with the zero tolerance graduation(s) of the measurement scale(s) located on the second plate.

* * * * *